(12) United States Patent
Satou et al.

(10) Patent No.: US 6,631,645 B1
(45) Date of Patent: Oct. 14, 2003

(54) SEMICONDUCTOR PRESSURE SENSOR UTILIZING CAPACITANCE CHANGE

(75) Inventors: Shinya Satou, Hitachi (JP); Keiji Hanzawa, Mito (JP); Satoshi Shimada, Hitachi (JP); Naohiro Monma, Hitachi (JP); Atsushi Miyazaki, Mito (JP)

(73) Assignees: Hitachi, Ltd., Tokyo (JP); Hitachi Car Engineering Co., Ltd., Hitachinaka (JP)

( * ) Notice: Subject to any disclaimer, the term of this patent is extended or adjusted under 35 U.S.C. 154(b) by 0 days.

(21) Appl. No.: 09/653,165

(22) Filed: Sep. 1, 2000

(30) Foreign Application Priority Data

Feb. 22, 2000 (JP) ........................................ 2000-044760

(51) Int. Cl.[7] ................................................. G01L 9/12
(52) U.S. Cl. ............................................ 73/718; 73/724
(58) Field of Search ................................... 73/716–728

(56) References Cited

U.S. PATENT DOCUMENTS 6,009,757 A * 1/2000 LeComte et al. ......... 361/283.4
6,051,853 A * 4/2000 Shimada et al. ............ 257/248
6,122,973 A * 9/2000 Nomura et al. ............... 73/724

FOREIGN PATENT DOCUMENTS

| JP | 5-231973 | 9/1993 | | |
|----|----------|--------|---|---|
| JP | 8-501156 | 2/1996 | | |
| JP | 10-289061 | * 4/2000 | ............ | G01L/9/12 |
| WO | WO 94/17383 | 8/1994 | | |

OTHER PUBLICATIONS

Cozma et al., "Electrostatic actuation as a self–testing method for silicon pressure sensors", Sensors and Actuators A 60 (1997) pp. 32–36.

* cited by examiner

Primary Examiner—Edward Lefkowitz
Assistant Examiner—Jermaine Jenkins
(74) Attorney, Agent, or Firm—Crowell & Moring LLP

(57) ABSTRACT

An S/N ratio of an output of a semiconductor pressure sensor is improved, the sensor being of an electrostatic capacitance type pressure sensor for generating an output based upon a ratio between capacitances of a pressure sensitive capacitance element and a reference capacitance element. This semiconductor pressure sensor has: a pressure sensitive capacitance element having an electrostatic capacitance Cs changing with a pressure to be detected; a reference capacitance element having an electrostatic capacitance Cr not changing with the pressure; and a unit for detecting the pressure by outputting a signal corresponding to a ratio between the capacitances Cs and Cr, wherein an initial value $Cr_0$ of the capacitance Cr and an initial value $Cs_0$ of the capacitance Cs are defined by $1.2 < Cr_0/Cs_0 < 1.8$. The $Cr_0/Cs_0$ ratio is adjusted by changing the electrode area or the like of both the elements. In this manner, it is possible to obtain a large pressure gauge output $\Delta V$, lower an amplification factor of the amplifier, and provide a high precision of the sensor.

4 Claims, 11 Drawing Sheets

SEMICONDUCTOR PRESSURE SENSOR UTILIZING CAPACITANCE CHANGE

BACKGROUND OF THE INVENTION

1. Field of the Invention

The present invention relates to a sensor for measuring a dynamic quantity by utilizing capacitance change, and more particularly to a semiconductor pressure sensor.

2. Description of the Related Art

Conventional techniques relevant to a pressure sensitive capacitance element of this invention are described in JP-A-8-501156 which presents an electrostatic capacitance type pressure gauge manufactured through etching of a sacrificial layer, such as shown in FIG. 20. This pressure gauge is constituted of a pressure sensitive capacitance element 2 whose capacitance value changes with an applied pressure, and a reference capacitance element 3 although whose capacitance value is similar to that of the capacitance element 2 it does not change with the applied pressure. The structure and operation principle of this pressure gauge will be described.

Referring to FIG. 20, a fixed electrode 6 is formed on the surface of a silicon substrate 1, and a movable electrode 5 made of a polysilicon film is formed over the fixed electrode 6, with a space 7 being interposed therebetween. This space 7 was formed by etching and removing a sacrificial film formed in the space 7, through etch channels 12 partially formed through the variable electrode 5. In order to vacuum seal this space 7, a sealing film 9 made of a silicon oxide film is formed closing the etch channels 12. The space 7 in this state forms a pressure reference chamber which was vacuum sealed. This space 7, fixed electrode 6 formed on the substrate in the pressure reference chamber, and movable electrode 5 made of the polysilicon film, constitute a capacitor. The reference capacitance element 3 has a similar structure to that of the pressure sensitive capacitance element 2. However, the sealing film 9 on the variable electrode 5 of the reference capacitance element 3 is not removed to increase a diaphragm rigidity.

As an external pressure changes, the variable electrode 5 of the pressure sensitive capacitance element 2 displaces by an amount corresponding to a difference between the external pressure and the pressure in the pressure reference chamber. Therefore, the gap between the variable electrode 5 and fixed electrode 6 changes and the capacitance changes. Since the reference capacitance element 3 has a high film rigidity, the variable electrode 5 will not be displaced by a pressure change and the capacitance thereof will not change.

The capacitance value of the pressure sensitive capacitance element 2 will be described quantitatively. An initial capacitance value $Cs_0$ of the pressure sensitive capacitance element 2 is given by:

$$Cs_0 = \in Ss/d_0 \quad (1)$$

where $\in$ is a dielectric constant of a material in the electrode gap, Ss is an electrode area, and $d_0$ is an initial electrode gap. If a pressure P displaces the electrode gap of the pressure sensitive capacitance element 2 by $\Delta d$ from the initial value $d_0$ and if $\Delta d = kP$ where k is a diaphragm spring constant, then:

$$Cs = \in Ss/(d_0 - \Delta d) = \in Ss/(d_0 - kP) \quad (2)$$

A capacitance value Cr of the reference capacitance element 3 is given by:

$$Cr = Cr_0 = \in Sr/d_0 \quad (3)$$

where $\in$ is a dielectric constant of a material in the electrode gap of the reference capacitance element 3, Sr is an electrode area, and $d_0$ is an initial electrode gap.

In a general differential capacitance type pressure sensor, a difference $\Delta C$ between these two elements is converted into a voltage $\Delta V$ by a C-V converter circuit and amplified by and output from an amplifier.

A first known example of the C-V converter circuit is described in JP-A-5-231973, and the circuit diagram thereof is shown in FIG. 21. This circuit is structured based upon a generally known switched capacitor circuit. An output of this circuit is given by:

$$Vout = \{(Cs-Cr)/Ci\} \cdot Vcc \quad (4)$$

The output changes with a capacitance difference of the pressure sensitive capacitance element 2 and reference capacitance element 3. As apparent from the equations (2) and (4), the output voltage Vout is nonlinear relative to the pressure P. This circuit is therefore associated with a problem that the output is required to be corrected in order to obtain a linear output.

A second known example of a C-V converter circuit which can solve this problem is described in Sensors and Actuators A60 (1970) pp. 32–36. In this circuit, an integration capacitance of an operational amplifier is used as the pressure sensitive capacitance element whose electrostatic capacitance changes with a pressure, and the charge quantity accumulated in this element is converted into a voltage signal. The circuit structure is shown in FIG. 22, and an output is given by the following equation (5):

$$Vout = -(Cr/Cs) \cdot V_B \quad (5)$$

By using the equations (1), (2) and (3), the equation (5) becomes:

$$Vout = (Cr_0/Cs_0) \cdot \{(kP/d_0) - 1\} \cdot V_B \quad (6)$$

Since the output voltage changes proportionally with the pressure P, a pressure detection precision can be improved.

Among various kinds of applications of a pressure sensor, a pressure sensor used for controlling a vehicle engine is required to have a high pressure detection precision and high noise resistance. A high precision capacitance type C-V converter circuit like the second known example is therefore preferable to be adopted. In order to improve the noise resistance, it is effective to have a large output signal $\Delta V$ of a pressure gauge and lower the amplification factor of the amplifier, from the viewpoint of an S/N ratio.

With the above-described capacitance type C-V converter circuit, a C-V conversion efficiency is determined by an initial capacitance value ratio between those of the pressure sensitive capacitance element and reference capacitance element, as indicated by the equation (6). Conventionally, this ratio has been set nearly to 1 and has not been used as a sensitivity adjustment parameter. Therefore, in order to have a large output of the pressure gauge, it is necessary to increase a displacement amount by lowering a diaphragm rigidity, or to increase the capacitance change $\Delta C$ itself by narrowing the electrode gap. However, lowering the diaphragm rigidity too much or narrowing the electrode gap may result in a contact between the diaphragm and substrate in the range of the measuring pressure. The degree of design freedom is therefore limited.

SUMMARY OF THE INVENTION

The present invention has been made to solve the above-described problems. It is an object of the invention to provide a pressure gauge of the type that a pressure is detected by using a capacitance ratio between those of a pressure sensitive capacitance element and reference capacitance element, the pressure gauge being capable of increasing a C-V conversion efficiency and improving a sensor output S/N ratio by using a simple method.

In order to achieve the above object, according to the main feature of the invention, a semiconductor pressure sensor comprises: a pressure sensitive capacitance element having an electrostatic capacitance Cs changing with a pressure to be detected; a reference capacitance element having an electrostatic capacitance Cr not changing with the pressure; and means for detecting the pressure by outputting a signal corresponding to a ratio between the capacitances Cs and Cr, wherein an initial value $Cr_0$ of the capacitance Cr and an initial value $Cs_0$ of the capacitance Cs are defined by $1.2 < Cr_0/Cs_0 < 1.8$.

DETAILED DESCRIPTION OF THE EMBODIMENTS

Figure 1:
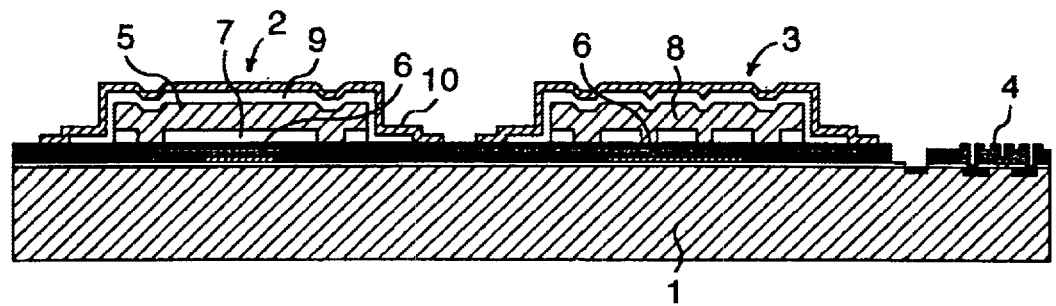
FIG. 1 is a cross sectional view of a semiconductor pressure sensor according to a first embodiment of the invention.
Figure 2:
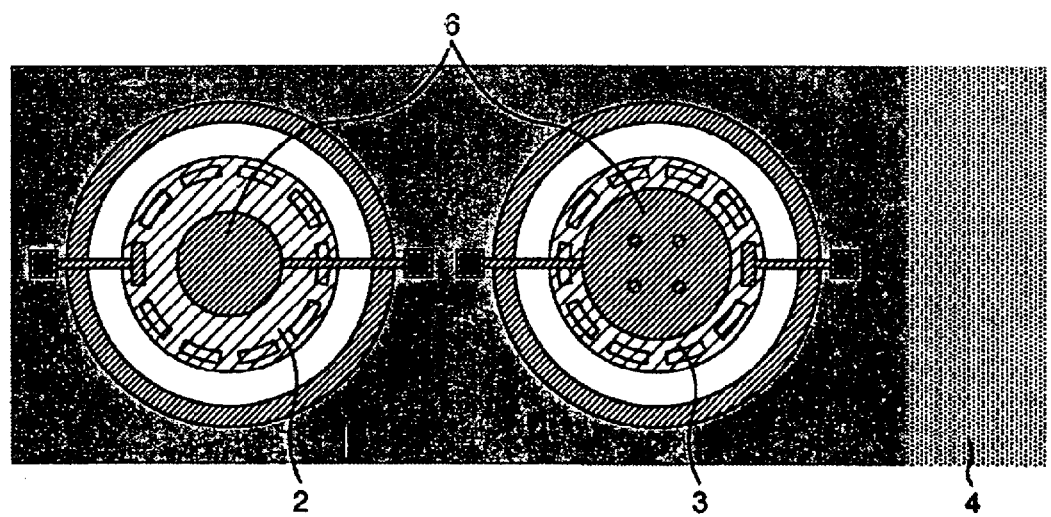
FIG. 2 is a plan view of the semiconductor pressure sensor of the first embodiment.

A semiconductor pressure sensor according to the embodiments of the invention will be described with reference to the accompanying drawings. FIG. 1 is a cross sectional view of a semiconductor pressure sensor gauge according to the first embodiment of the invention, and FIG. 2 is a plan view of the semiconductor pressure sensor. The structure of the sensor will be described with reference to FIGS. 1 and 2.

On the surface of a silicon substrate 1, a pressure sensitive capacitance element 2, a reference capacitance element 3 and a capacitance-voltage conversion circuit 4 made of C-MOS (hereinafter called a C-V conversion circuit 4) are formed.

The pressure sensitive capacitance element 2 has a fixed electrode 6 embedded in the upper surface layer of the substrate, and a movable electrode 5. These electrodes are disposed faced each other via a small space 7 to constitute a capacitance element structure. Formed on the variable electrode 5 are a sealing film 9 for vacuum sealing the inside of the small space 7 and a shielding and surface passivation film 10 formed on the sealing film 9. The structure of the reference capacitance element 3 is similar to that of the pressure sensitive capacitance element 2. However, in place of the variable electrode 5, a fixed electrode 8 with support columns is used to constitute the capacitance element whose capacitance will not change with an applied pressure. The diameter of the fixed electrode of the reference capacitance element 3 is made longer than that of the fixed electrode of the pressure sensitive capacitance element 2.

Figure 3:
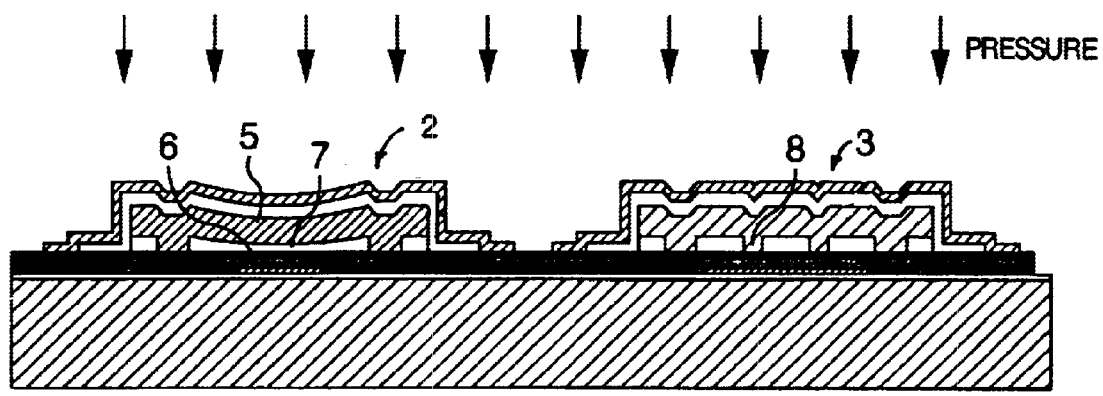
FIG. 3 is a cross sectional view illustrating the operation principle of the semiconductor pressure sensor of the first embodiment.

The operation principle will be described with reference to FIG. 3. Since the inside of the small space 7 is vacuum sealed, when a pressure is applied to the pressure sensitive capacitance element 2, the variable electrode 5 is flexed toward the substrate. Therefore, the gap between the fixed electrode 6 and variable electrode 5 becomes small and the capacitance changes with the applied pressure. Since the reference capacitance element 3 has the fixed electrode 8 with support columns, the capacitance will not change with the applied pressure. A difference between capacitance changes of the pressure sensitive capacitance element 2 and reference capacitance element 3 is converted into a voltage $\Delta V$ by the C-V converter circuit 4 and output therefrom.

Figure 4:
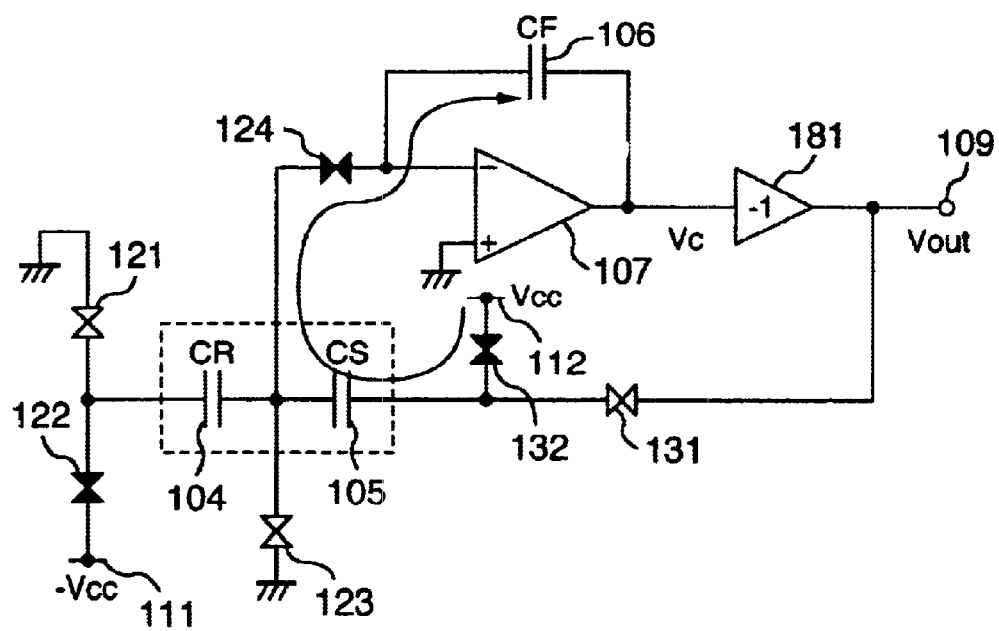
FIG. 4 is a diagram showing a capacitor-voltage conversion circuit using the semiconductor pressure sensor of the first embodiment.
Figure 5:
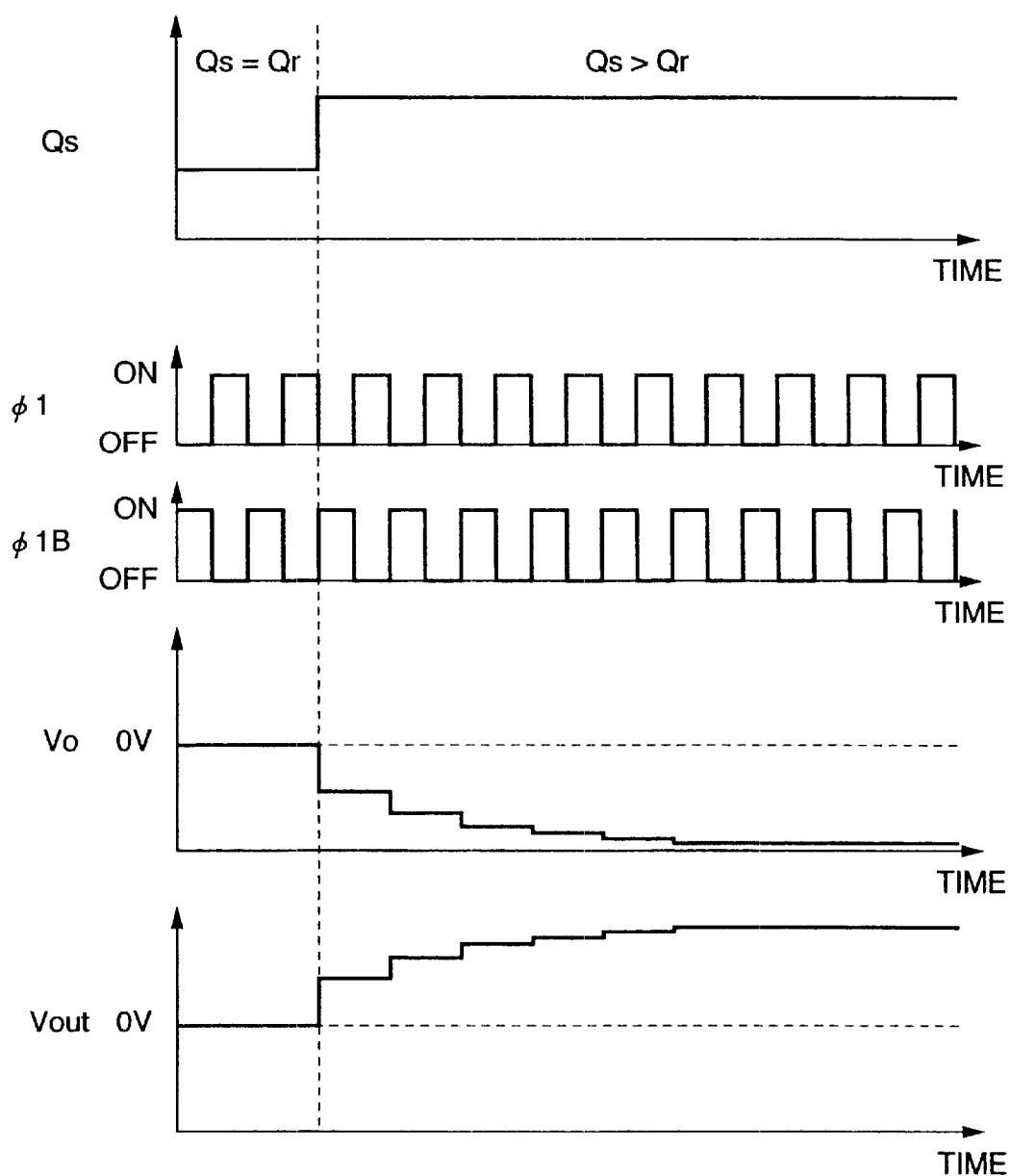
FIG. 5 is a timing chart illustrating the operation of the capacitor-voltage conversion circuit using the semiconductor pressure sensor of the first embodiment.

FIG. 4 shows the structure of the C-V conversion circuit of an electrostatic capacitance type dynamic quantity sensor of this invention. A timing chart illustrating the operation of the embodiment is shown in FIG. 5. This embodiment is constituted of a pressure sensitive capacitance element 2, a reference capacitance element 3, constant voltage sources 111, 112, switches 121, 122, 123, 124, 131, and 132, a capacitor 106, an operational amplifier 107, an inverter 181, and an output terminal 109.

The switches 121, 123 and 131 are driven by a drive signal φ1, and the switches 122, 124 and 132 are driven by an inverse phase drive signal φ1B. The inverter 181 multiplies an input signal by −1 and outputs it. This inverter 181 can be easily realized by a simple inverter amplifier using an operational amplifier, by a switched capacitor circuit, or by other circuits.

It is assumed that the initial value is Vout=0 V. While the switches 121, 123 and 131 are on, charges are not accumulated in both Cs and Cr. Charges Qs and Qr are accumulated instantly when the switches 122, 124 and 132 are turned on. If Qs is equal to Qr, current will not flow into an integration capacitor CF so that both outputs Vo and Vout maintain 0 V. If a force such as a pressure is applied, Cs increases and Qs becomes larger than Qr. Therefore, a difference between the charge quantity Qs accumulated in Cs and the charge quantity Qr accumulated in Cr is integrated in the capacitor CF (capacitance value Cf). This voltage Vo is given by the following equation (7):

$$Vo = \{(Cr-Cs)/Cf\} \cdot Vcc \quad (7)$$

Since the sensor output voltage Vout is Vo multiplied by −1, it is given by the following equation (8):

$$Vout = \{(Cs-Cr)/Cf\} \cdot Vcc \quad (8)$$

Therefore, at the next switching step, a voltage corresponding to (Vcc−Vout) is added to Cs. At the final step, the output voltage Vout changes to a value so that the charge quantity accumulated in Cs becomes equal to the charge quantity accumulated in Cr, and becomes stable at this voltage. This final voltage is given by:

$$Vout = \{1-(Cr/Cs)\} \cdot Vcc \quad (9)$$

With this circuit arrangement, an output voltage linear to the pressure P can be obtained. Although pulse voltage drive is used, Vout is obtained as a d.c. voltage. It is therefore advantageous in that a sample and hold circuit is unnecessary. By using the equations (1), (2) and (3), the equation (9) is changed to:

$$Vout = \{(Cr_0/Cs_0) \cdot (k/d_0) \cdot P + 1 - (Cr_0/Cs_0)\} \cdot Vcc \quad (10)$$

It can be therefore understood that in order to obtain a large gauge output voltage ΔV for the improvement of an S/N ratio, a ratio $Cr_0/Cs_0$ between initial values of Cs and Cr is adjusted. However, a conventional differential C-V converter circuit uses $Cr_0/Cs_0 \approx 1$, and does not incorporate the method of adjusting the sensitivity by changing the ratio $Cr_0/Cs_0$ between initial capacitance values.

The original object of differential output by using the pressure sensitive capacitance element and reference capacitance element is to eliminate a temperature-dependent change, manufacture variation, electromagnetic noises and the like. Conventionally, the absolute values of both $Cr_0$ and $Cs_0$ are made equal in order to make uniform the external disturbance influence degrees.

Figure 6:
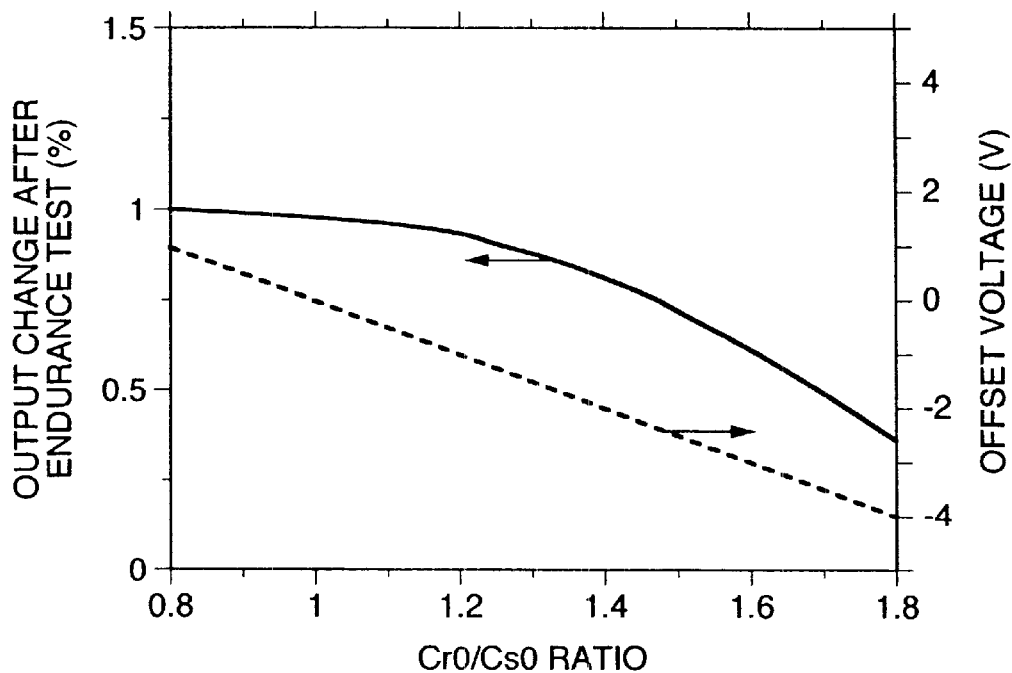
FIG. 6 is a graph showing a relation among a $Cr_0/Cs_0$ ratio, an output change after an endurance text, and an offset voltage.

As shown in FIG. 6, endurance tests under severe environments were made by using several samples having different $Cr_0/Cs_0$ ratios in a range from 0.8 to 1.8. In the graph of FIG. 6, a solid line indicates an output change after an endurance test, and a broken line indicates an offset voltage.

As shown in FIG. 6, an output change after the endurance test became small at the $Cr_0/Cs_0$ ratio in excess of about 1.2, and the larger the $Cr_0Cs_0$ ratio, the better results were obtained. This may be ascribed to that even if the $Cr_0Cs_0$ ratio is not set to 1, the noise elimination effects do not lower considerably but a large gauge output ΔV is obtained and an S/N ratio is improved in the $Cr_0Cs_0$ ratio range from 0.8 to 1.8.

If the $Cr_0Cs_0$ ratio is not set to 1, there arises a problem of a large offset output (refer to the broken line in FIG. 6). This can be solved by adding an offset voltage adjusting circuit to the C-V converter circuit. Since the adjustment range has a limit, the $Cr_0Cs_0$ ratio is set to 1.8 in this embodiment. In the present invention, the $Cr_0Cs_0$ ratio is set in a range lager than 1.2 and not larger than 1.8.

Figure 7:
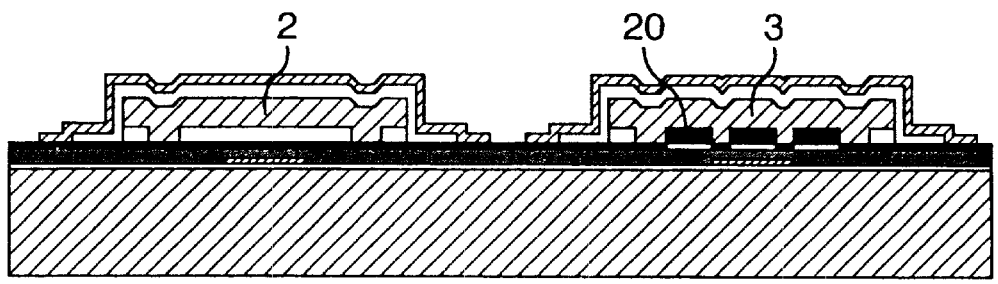
FIG. 7 is a cross sectional view showing an example of the structure of a reference capacitance element of the semiconductor pressure sensor of the first embodiment.
Figure 8:
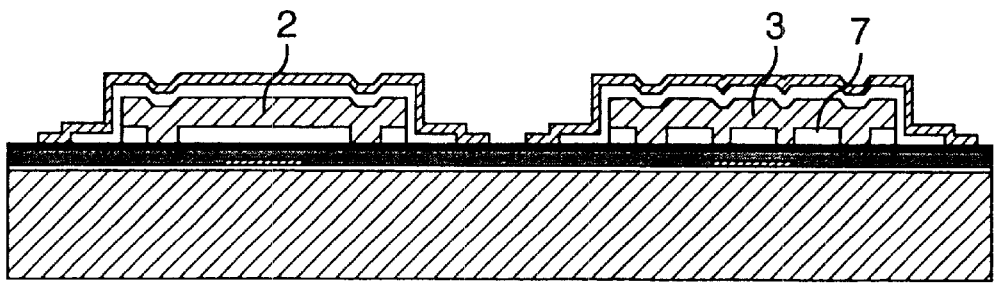
FIG. 8 is a cross sectional view showing another example of the structure of the reference capacitance element of the semiconductor pressure sensor of the first embodiment.

As indicated by the equations (2) and (3), the capacitance C is determined by the relative dielectric constant, electrode area and electrode gap. The $Cr_0Cs_0$ ratio can be adjusted by adjusting one of these parameters. If the manufacture processes are taken into consideration, the easiest adjustment parameter is the diameter of the fixed electrode. In this embodiment, the diameter of the fixed electrode of the reference capacitance element is set as root 1.8 times as longer than that of the fixed electrode of the pressure sensitive capacitance element to thereby set the $Cr_0Cs_0$ ratio to 1.8. Other adjustment methods may be a method of inserting a dielectric member 20 in the small space 7 of the reference capacitance element as shown in FIG. 7, a method of narrowing the gap of the small space 7 as shown in FIG. 8, or the like.

By adjusting the $Cr_0Cs_0$ ratio in the above manner, the gauge output ΔV can be increased. Therefore, a high precision sensor can be obtained by lowering the amplification factor of the amplifier and improving the S/N ratio.

Next, a method of manufacturing the semiconductor pressure sensor of this embodiment will be described. The sensor manufacture processes rely upon LSI manufacture processes.

Figure 9:
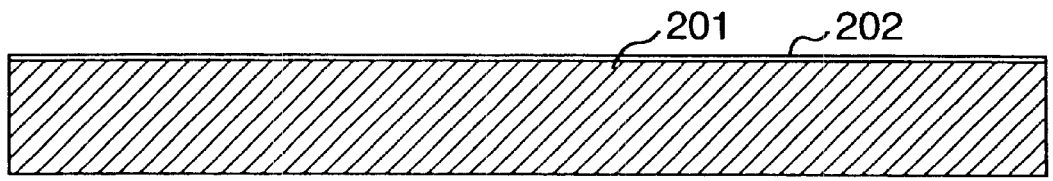
FIG. 9 is a cross sectional view of a substrate illustrating a process of manufacturing the semiconductor pressure sensor of the first embodiment.
Figure 10:
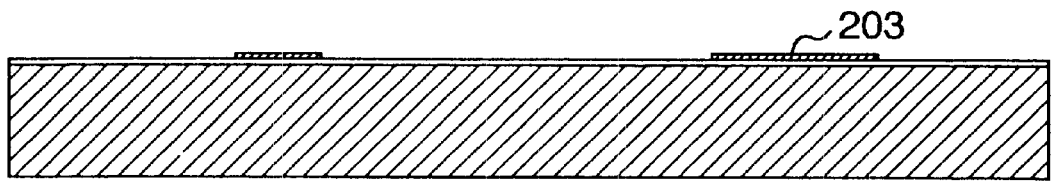
FIG. 10 is a cross sectional view of a substrate illustrating another process of manufacturing the semiconductor pressure sensor of the first embodiment.

First, as shown in FIG. 9, a single crystal silicon substrate 201 is thermally oxidized to form a silicon oxide film 202 serving as an insulating film on the substrate surface. Next, as shown in FIG. 10, on the surface of the silicon oxide film 202, a polysilicon film 203 is deposited by chemical vapor deposition (CVD). Then, impurities such as phosphorous ions are diffused into the polysilicon film 203 to make it electrically conductive. Thereafter, the polysilicon layer is patterned through photoetching to form fixed electrodes having desired shapes.

Figure 11:
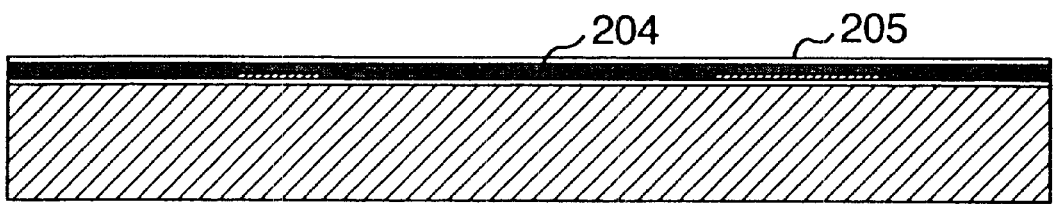
FIG. 11 is a cross sectional view of a substrate illustrating another process of manufacturing the semiconductor pressure sensor of the first embodiment.
Figure 12:
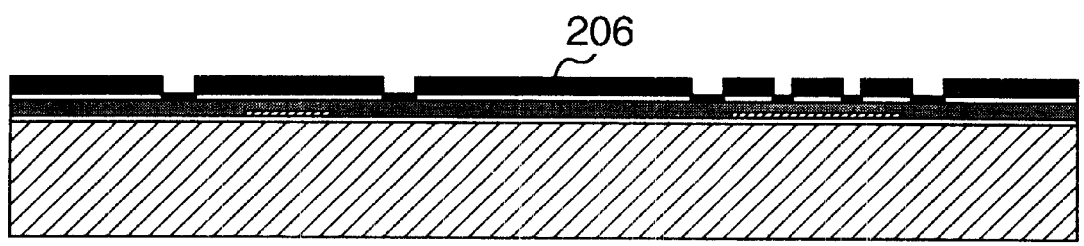
FIG. 12 is a cross sectional view of a substrate illustrating another process of manufacturing the semiconductor pressure sensor of the first embodiment.

Next, as shown in FIG. 11, a silicon oxide film 204 and a silicon nitride film 205 are sequentially deposited by CVD on the substrate surface, these films serving as a barrier layer. Thereafter, as shown in FIG. 12, a sacrificial layer 206 made of phosphosilicate glass (PSG) is formed by CVD. The sacrificial layer has a thickness equal to a height (electrode gap) of a small space to be later formed. This sacrificial layer 206 is etched through photoetching to form desired spaces 7 having desired shapes, diaphragm fixing portions, and etch channels all at the same time.

Figure 13:
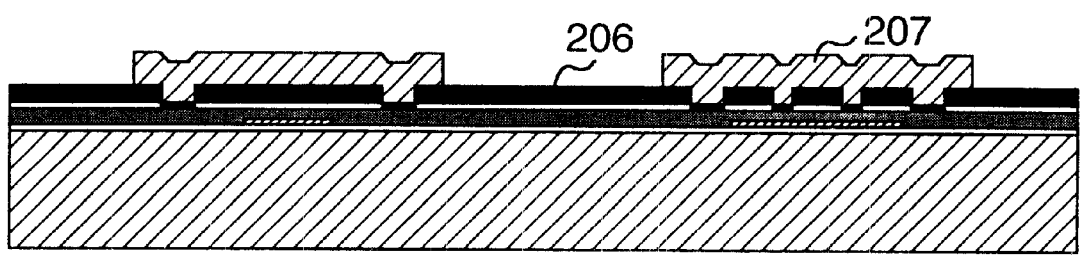
FIG. 13 is a cross sectional view of a substrate illustrating another process of manufacturing the semiconductor pressure sensor of the first embodiment.

Next, as shown in FIG. 13, a polysilicon film 207 is formed by CVD, partially covering the sacrificial layer 206. Then, impurities such as phosphorous ions are diffused into the polysilicon film 207 to make it electrically conductive. Thereafter, the polysilicon layer is patterned through photoetching to form diaphragms having desired shapes. In this case, part of the sacrificial layer 206 is exposed by the etch channels.

Figure 14:
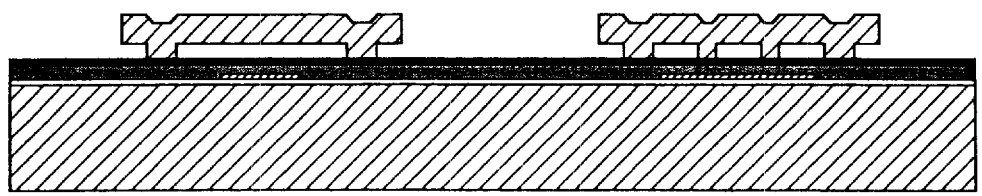
FIG. 14 is a cross sectional view of a substrate illustrating another process of manufacturing the semiconductor pressure sensor of the first embodiment.
Figure 15:
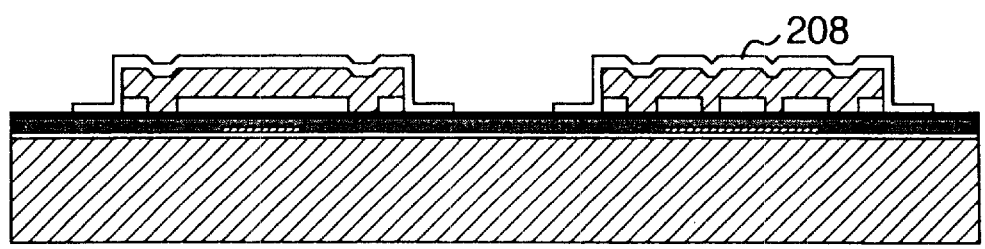
FIG. 15 is a cross sectional view of a substrate illustrating another process of manufacturing the semiconductor pressure sensor of the first embodiment.

This substrate is immersed in HF containing etchant. Only the sacrificial layer 206 is therefore removed via the etch channels, and small spaces 7 surrounded between the substrate and polysilicon film 207 are formed, as shown in FIG. 14. Next, as shown in FIG. 15, a silicon oxide film 208 is formed by CVD, covering the substrate and polysilicon film 208. The silicon oxide film 208 is patterned by photoetching to have desired shapes. Since CVD is performed in generally a vacuum state, the small space is vacuum sealed and is used as a pressure reference chamber for forming an absolute pressure sensor.

Figure 16:
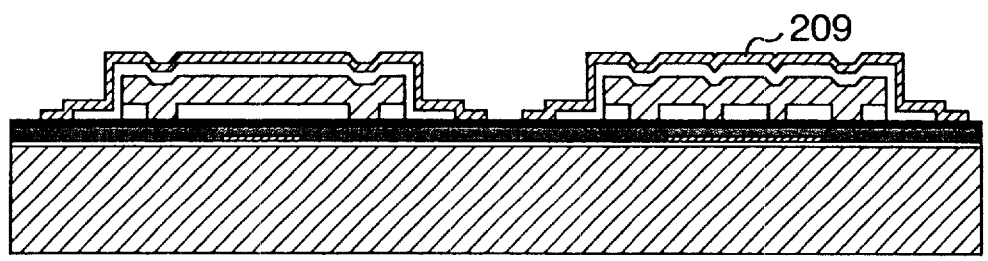
FIG. 16 is a cross sectional view of a substrate illustrating another process of manufacturing the semiconductor pressure sensor of the first embodiment.

Thereafter, as shown in FIG. 16, a polysilicon film 209 is formed on the surface of the oxide film 208 by CVD, the polysilicon film 209 serving as a shielding and surface passivation film. The polysilicon film is then patterned by photoetching to complete the gauge structures.

Figure 17:
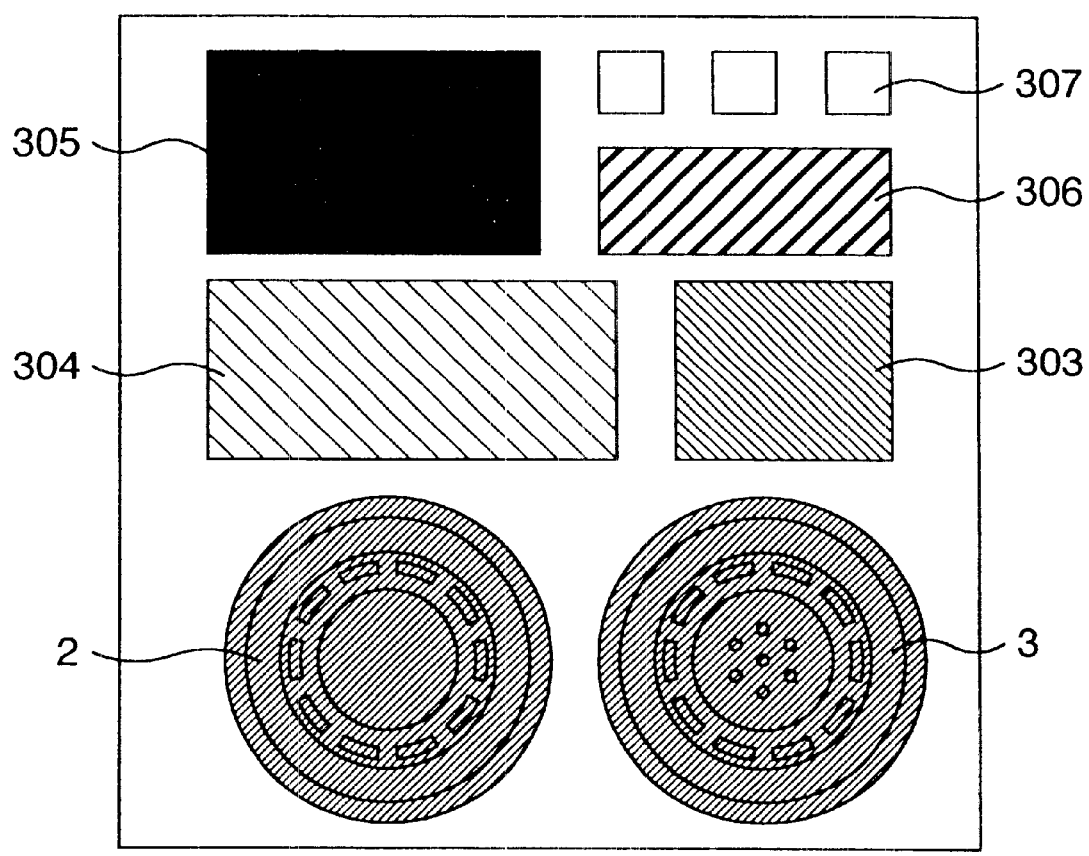
FIG. 17 is a plan view of a semiconductor pressure sensor having a pressure gauge and an amplifier circuit according to a second embodiment of the invention.

FIG. 17 shows a pressure sensor having an amplifier circuit and pressure gauges and integrated on one chip, according to the second embodiment. An output of a pressure gauge has generally a temperature error and a nonlinear error. Therefore, if this output is simply amplified by an amplifier, a pressure detection precision lowers. In order to avoid this, output errors such as nonlinear errors and temperature errors are stored in advance in a ROM, and the output is corrected through digital processing to thereby improve the precision. The sensor of this embodiment is constituted of a pressure sensitive capacitance element 2, a reference capacitance element 3, an oscillator 303, a capacitance detector circuit 4, an output adjusting circuit 305, a ROM 306, and electrode pads 307.

For the sensor of this embodiment, temperature errors and nonlinear errors of the pressure gauges are measured in advance and written as output correction data in ROM 306. In operation, the output of the output gauges are digitalized by the output adjusting circuit 305, corrected by using the output correction data, and again converted into analog signals to be output. In this embodiment, the pressure gauges and the amplifier circuit with the output adjusting circuit are integrated. The output gauges having a high precision and being compact and low cost can therefore be realized.

Figure 18:
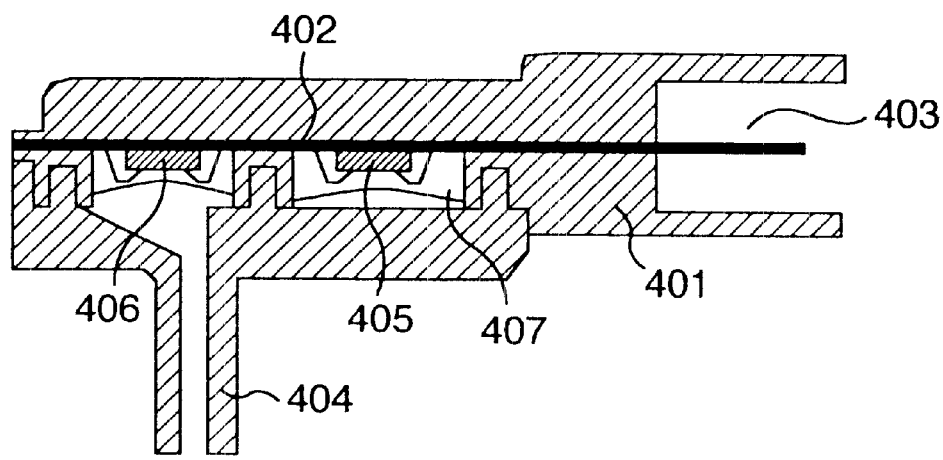
FIG. 18 is a cross sectional view showing an example of mounting a semiconductor pressure sensor according to an embodiment of the invention.

FIG. 18 shows a mount example of pressure gauges to be used as a suction air pressure sensor for vehicle engine control. The pressure sensor is constituted of: a pressure gauge chip 406; an amplifier circuit chip 405; a lead frame 402 used as a bonding base for the chips 406 and 405; a cover 404 with a pressure guiding hole; and a connector 403. After the pressure gauge chip 406 and amplifier circuit chip 405 are bonded to the lead frame 402, wire bonding between chip terminals and the frame is performed. Thereafter, the upper surface of the sensor is covered with gel 407, and then the cover 404 with the pressure guide hole is adhered to complete the sensor.

Figure 19:
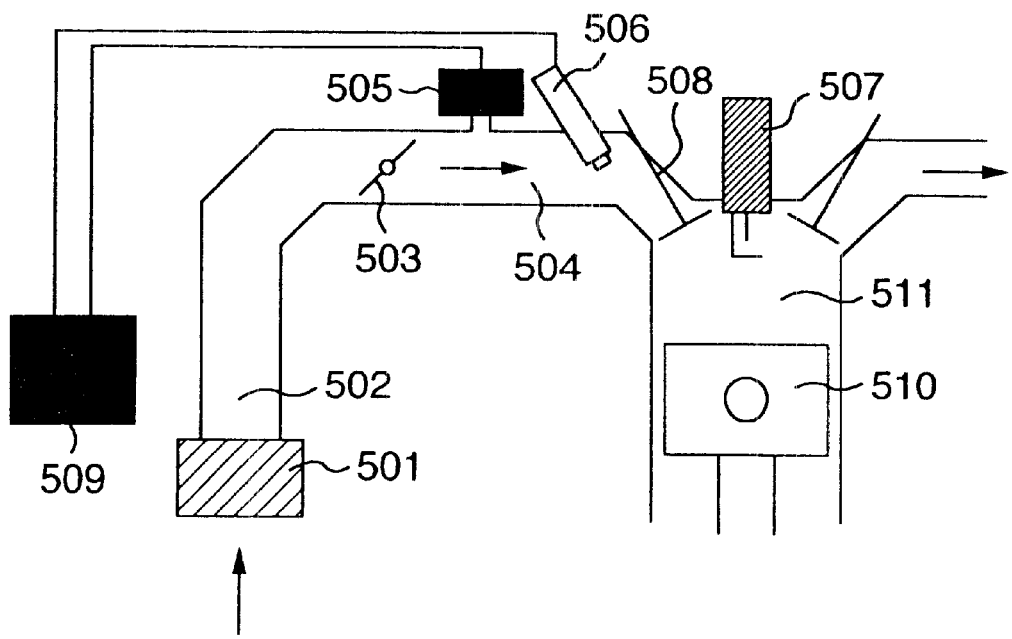
FIG. 19 is a diagram showing a vehicle engine control system using a semiconductor pressure sensor according to an embodiment of the invention.
Figure 20:
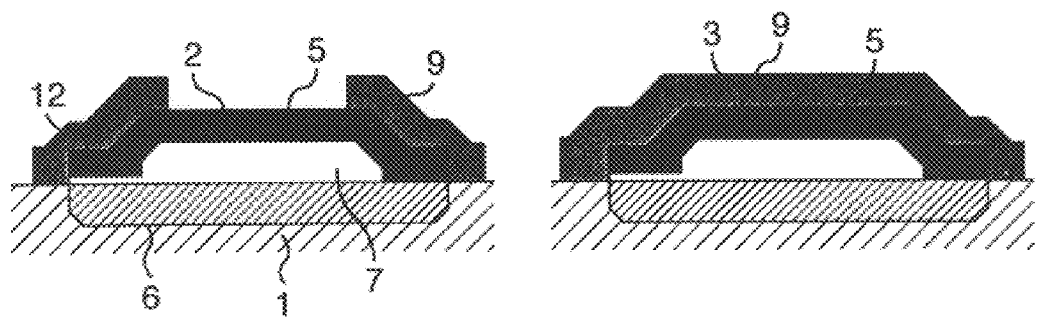
FIG. 20 is a cross sectional view showing a conventional pressure sensitive capacitance element and a conventional reference capacitance element.
Figure 21:
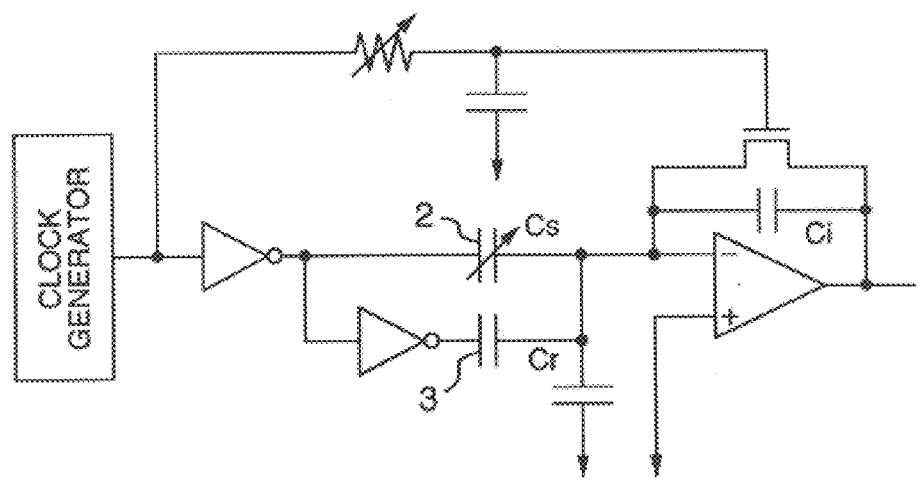
FIG. 21 is a diagram of a conventional capacitance-voltage conversion circuit.
Figure 22:
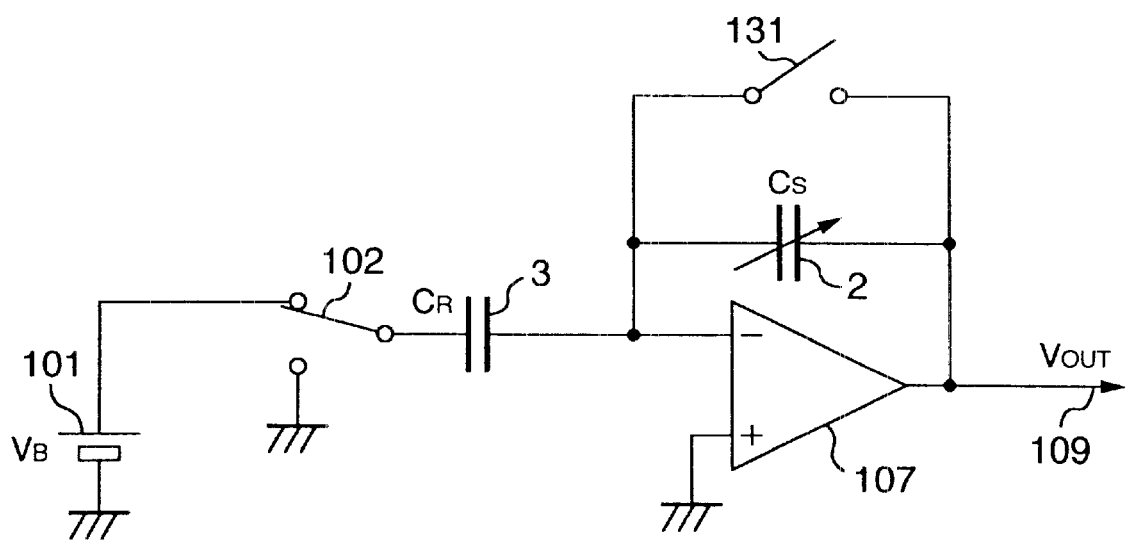
FIG. 22 is a diagram of a conventional capacitance-voltage conversion circuit.

FIG. 19 shows a vehicle engine control system using a pressure sensor of this invention as a suction air pressure sensor. External air passes through an air cleaner 501 and introduced into an air suction tube 502. The air flow rate is regulated by a throttle valve 503, and thereafter the air is introduced into a suction air manifold 504. A pressure sensor 505 of this invention is mounted in this suction air manifold 504 to detect the pressure in the manifold 504. In accordance with a signal from the output sensor 505 and an engine revolution signal, an engine control unit 509 calculates a suction air quantity and a fuel ejection quantity most suitable for the suction air quantity, and supplies an ejection signal to an injector 506. Gasoline ejected from the injector 506 is mixed with the suction air to form a mixed air which is introduced into a combustion chamber 509 when a suction valve 508 is opened. After the mixed air is compressed by a piston 510, it explodes and burns with the help of a spark plug 507.

As in this embodiment, if a pressure sensor is used with a vehicle engine control system for measuring a suction air flow rate, a very high measurement precision is required under very severe environments because the engine room has various external disturbances such as high temperature, dusts, and spark noises of the spark plug. However, the pressure sensor of this invention has a large gauge output voltage $\Delta V$ and a high S/N ratio by increasing the $Cr_0/Cs_0$ ratio. Therefore, this pressure sensor is excellent in noise resistance and satisfies such a high precision required.

The gauge structure and C-V converter circuit of this invention can be applied to other sensors for detecting a dynamic quantity by utilizing a capacitance change, such as an acceleration sensor, a tactile sensor, and a gyro infrared sensor.

As described so far, the main feature of the invention resides in the following point. In a pressure gauge of the type that a pressure is detected by using a ratio between capacitances of a pressure sensitive capacitance element and a reference capacitance element, the capacitances are set by adjusting the electrode area of the elements or other parameters to thereby set the $Cr_0/Cs_0$ ratio larger than 1. A so-called conversion efficiency ($\Delta C \rightarrow \Delta V$) of converting a capacitance difference value $\Delta C$ between both the elements into a voltage $\Delta V$ can therefore be improved.

In the pressure gauge of the type that a pressure is detected by using a ratio between capacitances of a pressure sensitive capacitance element and a reference capacitance element, the $Cr_0/Cs_0$ ratio is adjusted to obtain a large gauge output $\Delta V$ and lower an amplification factor of the amplifier. An S/N ratio and precision of the sensor can therefore be improved.

What is claimed is:

1. A semiconductor pressure sensor comprising:

a pressure sensitive capacitance element having an electrostatic capacitance Cs changing with a pressure to be detected;

a reference capacitance element having an electrostatic capacitance Cr not changing with the pressure; and means coupled to receive output signals from said pressure sensitive and reference capacitance elements, indicative of Cs and Cr respectively, for detecting pressure by outputting a signal corresponding to a ratio between the capacitances Cs and Cr;

wherein an initial value $Cr_0$ of the capacitance Cr and an initial value $Cs_0$ of the capacitance Cs are defined by $1.2 < Cr_0/Cs_0 < 1.8$.

2. The pressure sensor according to claim 1, wherein:

each of the pressure sensitive and reference capacitive elements comprises first and second electrodes having respective surface areas separated by a gap having a dielectric material therein; and the surface areas of the electrodes of the pressure sensitive capacitive element differ from the surface areas of the electrodes of the reference capacitive element, such that $1.2 < Cr_0/Cs_0 < 1.8$ is set.

3. The pressure sensor according to claim 1, wherein:

each of the pressure sensitive and reference capacitive elements comprises first and second electrodes having respective surface areas separated by a gap having a dielectric material therein; and a width of the gap in the pressure sensitive capacitive element differs from a width of the gap in the reference capacitive element, such that $1.2 < Cr_0/Cs_0 < 1.8$ is set.

4. The pressure sensor according to claim 1, wherein:

each of the pressure sensitive and reference capacitive elements comprises first and second electrodes having respective surface areas separated by a gap having a dielectric material therein; and a dielectric constant of the material in the gap of the pressure sensitive capacitive element differs from a dielectric constant of a material in the gap of the reference capacitive element, such that $1.2 < Cr_0/Cs_0 < 1.8$ is set.

* * * * *